US012659062B2

(12) United States Patent
Gn et al.

(10) Patent No.: US 12,659,062 B2
(45) Date of Patent: Jun. 16, 2026

(54) AUDIO BROADCAST MANAGEMENT BASED ON AUDIO DISRUPTION

(71) Applicant: Motorola Mobility LLC, Chicago, IL (US)

(72) Inventors: Vijayakumar Gn, Bangalore (IN); Vineet Vivekanand Angadi, Dharwad (IN); Ashwin Kumar Manmohan Pathmudi, Pune (IN)

(73) Assignee: Motorola Mobility LLC, Chicago, IL (US)

( * ) Notice: Subject to any disclaimer, the term of this patent is extended or adjusted under 35 U.S.C. 154(b) by 287 days.

(21) Appl. No.: 18/613,477

(22) Filed: Mar. 22, 2024

(65) Prior Publication Data

US 2025/0300752 A1     Sep. 25, 2025

(51) Int. Cl.
| | |
|---|---|
| *H04H 20/71* | (2008.01) |
| *G06F 3/16* | (2006.01) |
| *H04R 3/00* | (2006.01) |

(52) U.S. Cl.
CPC ............. *H04H 20/71* (2013.01); *G06F 3/162* (2013.01); *G06F 3/165* (2013.01); *H04R 3/00* (2013.01); *H04R 2420/01* (2013.01); *H04R 2420/07* (2013.01)

(58) Field of Classification Search
CPC ......... H04H 20/71; G06F 3/162; G06F 3/165; H04R 3/00; H04R 2420/01; H04R 2420/07
See application file for complete search history.

(56) References Cited

U.S. PATENT DOCUMENTS

| | | | | |
|---|---|---|---|---|
| 10,091,564 | B2 | 10/2018 | Swanson | |
| 11,818,555 | B2 * | 11/2023 | Liu | H04W 4/80 |
| 11,963,074 | B2 * | 4/2024 | Chiang | H04W 4/90 |
| 12,075,220 | B2 * | 8/2024 | Kumar | H04R 3/12 |
| 12,127,282 | B2 * | 10/2024 | Pu | H04W 4/80 |
| 2020/0153567 | A1 * | 5/2020 | Agarwal | H04L 1/1692 |
| 2023/0362795 | A1 * | 11/2023 | Han | H04W 48/10 |
| 2024/0241688 | A1 * | 7/2024 | Russell | G06F 3/165 |

FOREIGN PATENT DOCUMENTS

| | | | | |
|---|---|---|---|---|
| CN | 116828401 A | * | 9/2023 | H04W 4/06 |

* cited by examiner

*Primary Examiner* — David L Ton
(74) *Attorney, Agent, or Firm* — FIG. 1 Patents

(57) ABSTRACT

In aspects of audio broadcast management based on audio disruption, a wireless device receives an audio broadcast from an audio source device, and initiates a connection to the audio broadcast. The wireless device detects an audio disrupt event of the audio broadcast based on audio frequency data, audio intensity data, or a predefined time limit associated with the audio broadcast. In response to this, the wireless device initiates a disconnection from the audio broadcast, and initiates a connection to a new in-range audio broadcast.

20 Claims, 8 Drawing Sheets

200

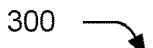
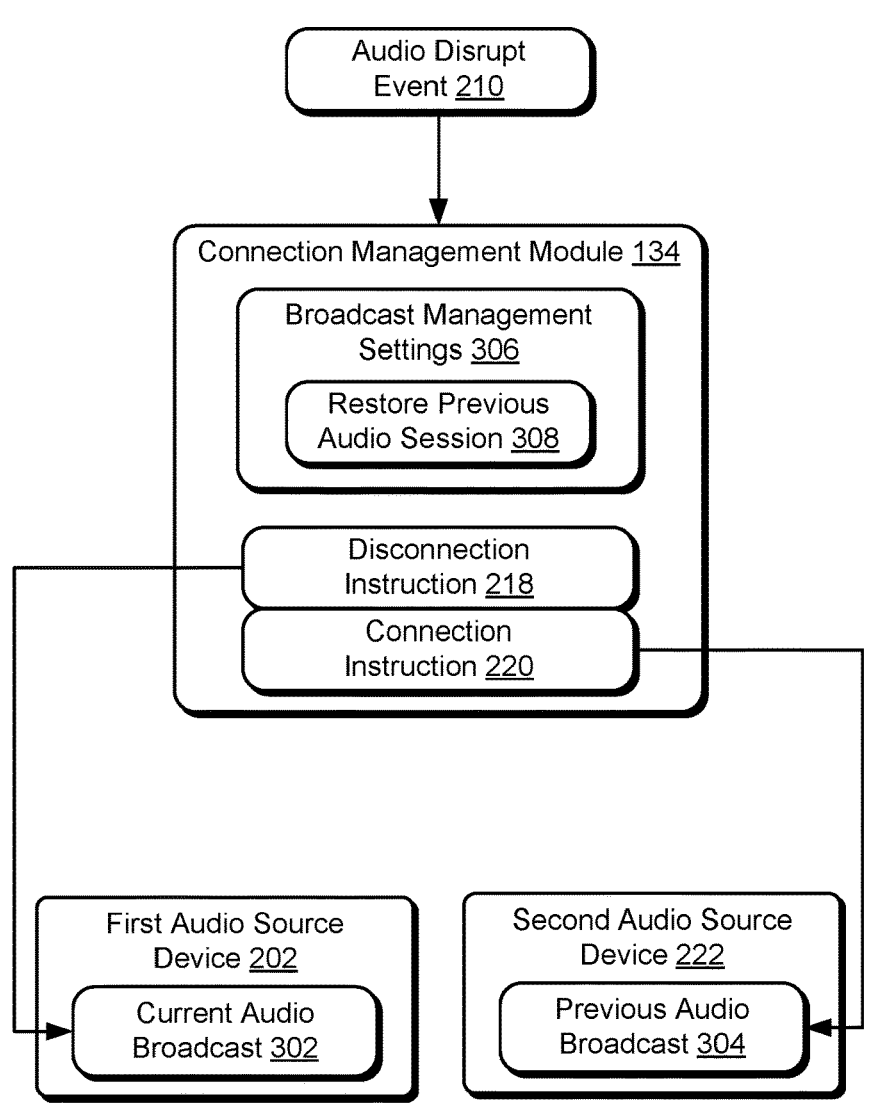
*Fig. 3*

500

600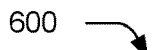

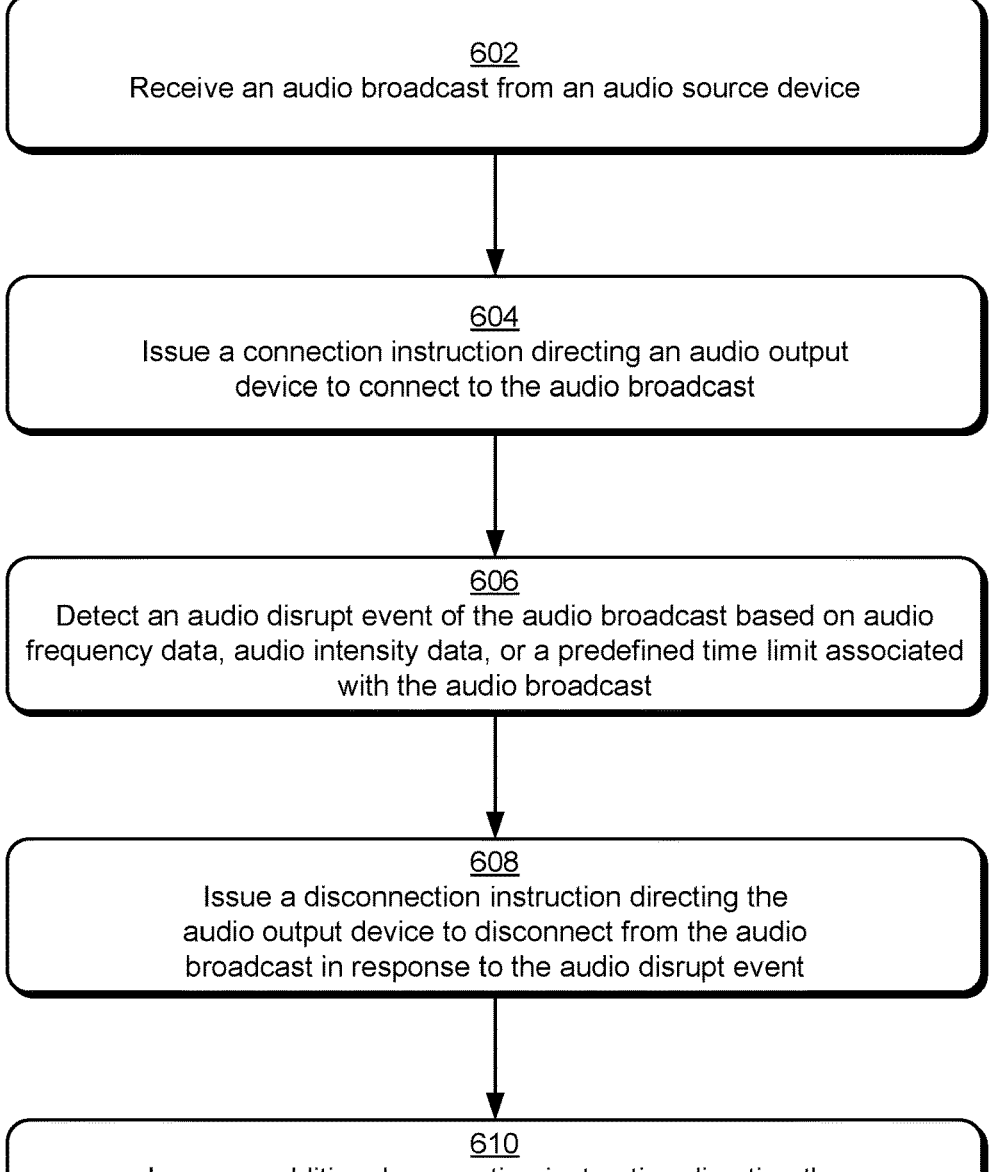

602
Receive an audio broadcast from an audio source device

604
Issue a connection instruction directing an audio output device to connect to the audio broadcast

606
Detect an audio disrupt event of the audio broadcast based on audio frequency data, audio intensity data, or a predefined time limit associated with the audio broadcast

608
Issue a disconnection instruction directing the audio output device to disconnect from the audio broadcast in response to the audio disrupt event

610
Issue an additional connection instruction directing the audio output device to connect to a new audio broadcast received from a different audio source device

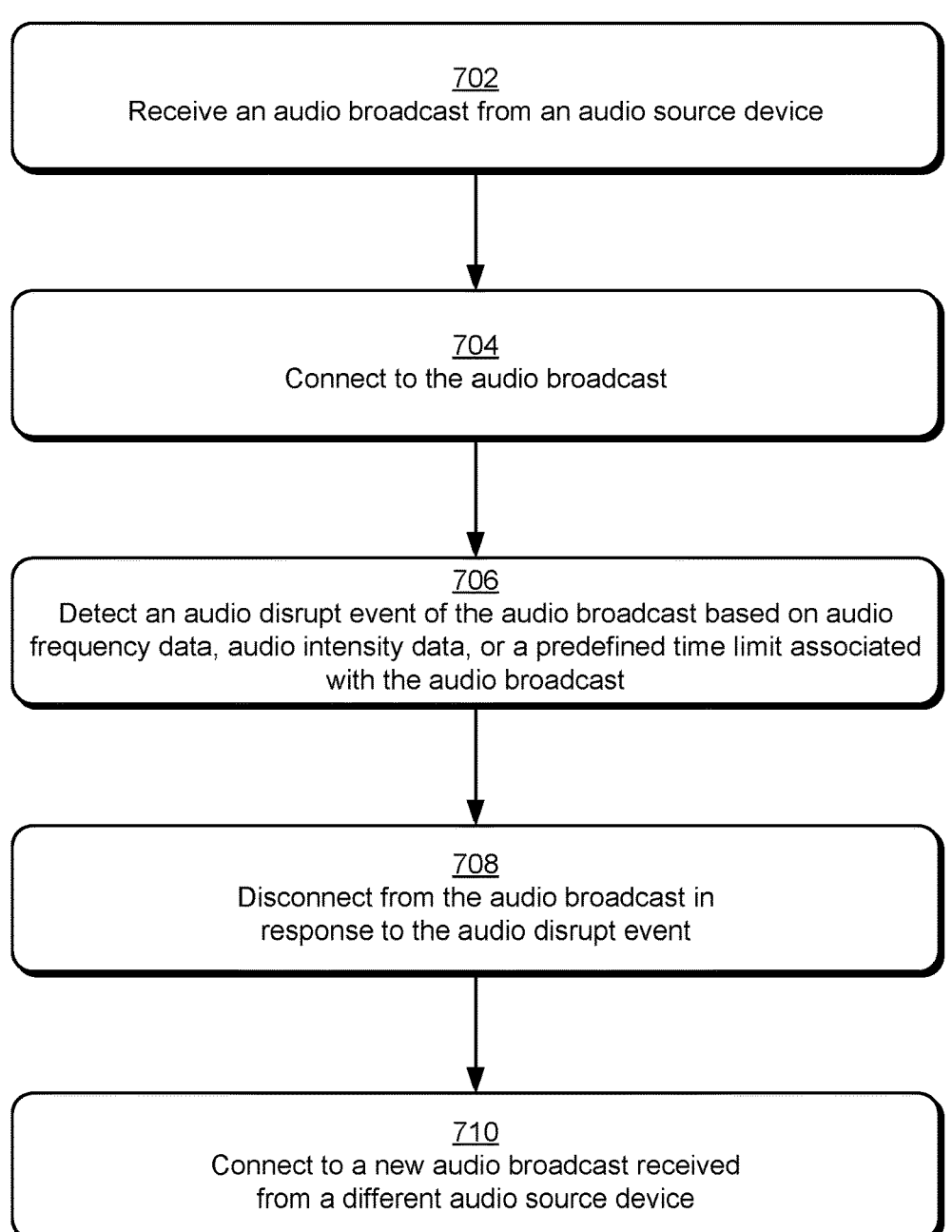

702
Receive an audio broadcast from an audio source device

704
Connect to the audio broadcast

706
Detect an audio disrupt event of the audio broadcast based on audio frequency data, audio intensity data, or a predefined time limit associated with the audio broadcast

708
Disconnect from the audio broadcast in response to the audio disrupt event

710
Connect to a new audio broadcast received from a different audio source device

*Fig. 7*

AUDIO BROADCAST MANAGEMENT BASED ON AUDIO DISRUPTION

BACKGROUND

Computing devices often include functionality for wirelessly connecting to audio broadcasts. For example, transmitting devices broadcast audio signals to a plurality of receiving devices concurrently. If the receiving devices are in-range, the receiving devices can connect to an audio broadcast, and playback audio of the audio broadcast. Given this, transmitting devices are often available in public spaces, and the audio broadcasts are publicly available for connection. This enables users of different receiving devices to consume audio content of different transmitting devices without disturbing the consumption experience of other users.

BRIEF DESCRIPTION OF THE DRAWINGS

Aspects of audio broadcast management based on audio disruption are described with reference to the following Figures. The same numbers may be used throughout to reference similar features and components that are shown in the Figures.

FIG. 3 depicts an example in which a previous audio broadcast is automatically restored responsive to an audio disrupt event.

FIG. 6 is an example method for audio broadcast management based on audio disruption, as implemented by a wireless device communicatively coupled via a wireless connection to an audio output device.

FIG. 7 is an example method for audio broadcast management based on audio disruption, as implemented by a standalone wireless device.

DETAILED DESCRIPTION

Figure 1:
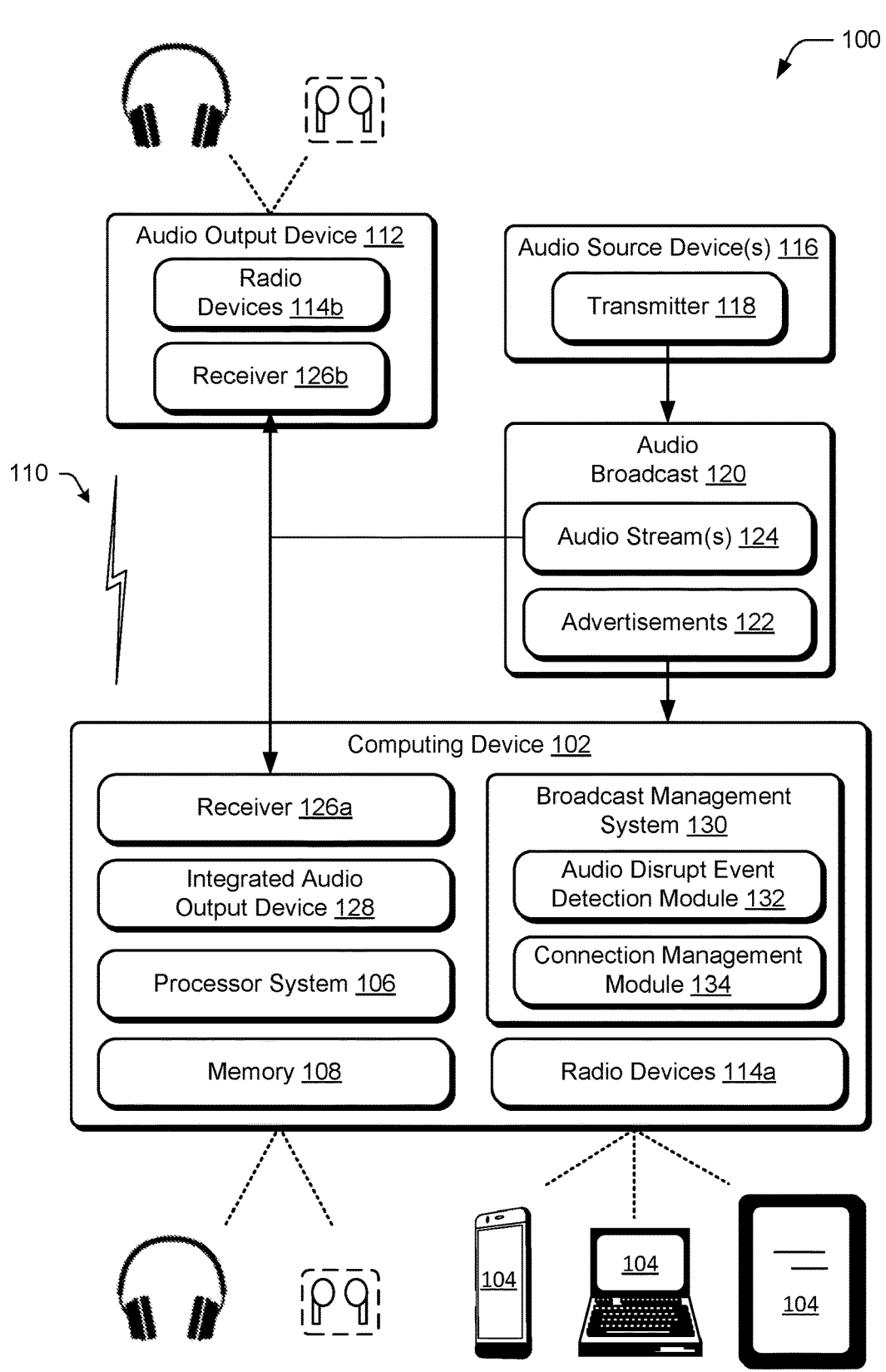
FIG. 1 illustrates an example environment in which aspects of audio broadcast management based on audio disruption can be implemented.

Techniques for audio broadcast management based on audio disruption are described herein as implemented by a computing device. In one or more implementations, the computing device includes an integrated audio output device. For example, the computing device is a smartphone having an integrated or built-in speaker, or the computing device is or corresponds to an audio output device such as wireless headphones or wireless earbuds having speakers generally configured for audio output. Additionally or alternatively, the computing device is communicatively coupled, via a wireless connection (e.g., a Bluetooth connection) to an external audio output device, e.g., wireless headphones or wireless earbuds. The computing device and/or the external audio output device are in an environment that includes one or more audio source devices.

The audio source devices are media output devices (e.g., smart TVs, display devices, tablets, broadcast public addresses) configured as or including a transmitter capable of transmitting an audio broadcast. Furthermore, the computing device and/or the external audio output device are configured as or include receivers, which are generally configured to receive audio streams of the audio broadcasts for playback at the computing device or the external audio output device. In one or more implementations, the audio source devices are configured to broadcast audio data to a plurality of in-range receivers concurrently.

In accordance with the described techniques, the computing device scans for advertisements of audio broadcasts from in-range audio source devices. The advertisements generally advertise the availability of in-range audio broadcasts and include information about the audio broadcast, e.g., broadcast name, name of audio source device, content description, codec configuration, and so on. Using the information, the computing device initiates connections to audio broadcasts.

In one or more implementations, initiating a connection includes communicating a connection instruction to the external audio output device along with information from the advertisements, which enables the external audio output device to connect to an audio broadcast. As a result, the external audio output device begins playing back audio stream(s) of the connected audio broadcast. Additionally or alternatively, initiating a connection includes connecting the computing device directly to an audio broadcast. As a result, the integrated audio output device of the computing device begins playing back audio stream(s) of the connected audio broadcast.

Conventional audio broadcast playback technologies have limitations, however. For example, audio broadcasts are often broadcast on a loop or terminate (e.g., cease audio output) after being played through once. Moreover, conventional audio broadcast playback techniques rely on manual user input to facilitate connecting to and disconnecting from audio broadcasts. This frustrates the user experience when interacting with audio broadcasts as a user is either (1) irritated and/or bored listening to repeated audio of a looped audio broadcast or silence of a terminated audio broadcast, or (2) irritated having to manually disconnect from looped and/or terminated audio broadcasts and manually connect to other sources of audio content. In addition, looped audio broadcasts waste battery life of the devices receiving communication signals of the audio broadcast.

Accordingly, techniques are described for audio broadcast management based on audio disruption which overcome the drawbacks of conventional techniques. The described techniques are implemented by a broadcast management system of the computing device, which receives advertisements of one or more audio broadcasts. Further, the broadcast management system initiates a connection of the computing device or the external audio output device to a particular audio broadcast. In addition, the broadcast management system collects audio frequency data and audio output data of the audio stream(s) that are played back at the integrated audio output device or the external audio output device. The broadcast management system is configured to detect audio disrupt events based on the audio frequency data and/or the audio intensity data. Broadly, an audio disrupt event is representative of a point in time in which the audio stream(s)

restart on a loop or cease causing output of audio at the integrated audio output device or the external audio output device.

In one or more implementations, the audio disrupt event is detected as looped audio in the audio stream(s). As part of this, the broadcast management system generates a spectrogram by plotting the audio frequency of the played back audio stream(s) against time. Further, the broadcast management detects a loop by detecting repeating patterns present in the spectrogram. Additionally or alternatively, the audio disrupt event is detected as paused or terminated audio in the audio stream(s). As part of this, the broadcast management system detects paused or terminated audio based on the audio intensity of the audio stream(s) falling below a threshold for at least a threshold amount of time.

Once an audio disrupt event is detected, the broadcast management system initiates a disconnection from the particular audio broadcast. For example, the broadcast management system issues a disconnection instruction directing the external audio output device to disconnect from the particular audio broadcast. Additionally or alternatively, the broadcast management system disconnects the computing device from the particular audio broadcast. In various implementations, the broadcast management system further initiates a connection to a new audio broadcast in response to the disconnection from the particular audio broadcast. In accordance with the described techniques, the new audio broadcast is determined based on user-specified broadcast management settings.

Accordingly, the described techniques provide functionality for automatically (e.g., without human intervention) disconnecting from a looped and/or terminated audio broadcast and, in response, automatically connecting to a new in-range audio broadcast. By doing so, the described techniques improve user experience with audio broadcasts by relieving the user of listening to repeated audio of a looped audio broadcast, listening to silence of a terminated audio broadcast, and/or manually initiating broadcast disconnection and broadcast connection processes. In addition, the described techniques reduce battery wastage by the computing device and/or the external audio output device by disconnecting from (and thereby ceasing to receive and process communication signals of) looped audio broadcasts.

While features and concepts of the described techniques for audio broadcast management based on audio disruption can be implemented in any number of different devices, systems, environments, and/or configurations, implementations of the techniques for user interface adjustments for ergonomic device grip are described in the context of the following example devices, systems, and methods.

FIG. 1 illustrates an example environment 100 in which aspects of audio broadcast management based on audio disruption can be implemented. Generally, the environment 100 includes a computing device 102, which implements features and techniques of audio broadcast management based on audio disruption. The computing device 102 is configurable in a variety of ways. In one or more implementations, the computing device 102 is a wireless device with a display screen 104, such as a smartphone, a mobile phone, a laptop computer, or tablet, as illustrated. Additionally or alternatively, the computing device 102 can be any other type of electronic, computing, and/or communication device, such as a desktop computer, a smart TV, a game console, wireless over-ear headphones, wireless earbuds, and wireless hearing aids, to name just a few. In one or more examples, the computing device 102 is implemented with various components, such as a processor system 106, a memory 108, as well as any number and combination of different components, as further described with reference to the example device of FIG. 8.

In one or more implementation, the computing device 102 is communicatively linked, via a wireless connection 110, to an audio output device 112. Generally, the audio output device 112 includes one or more speakers for outputting audio data, e.g., for listening by a user wearing and/or using the audio output device 112. The audio output device 112 is configurable in a variety of ways, such as wireless over-ear headphones, wireless earbuds, wireless hearing aids, wireless speakers, to name just a few. To facilitate the wireless connection 110, the computing device 102 includes radio devices 114a, and the audio output device 112 includes radio devices 114b. By way of example, the radio devices 114a, 114b include Bluetooth radios, and the wireless connection 110 is a Bluetooth connection. In one or more examples, audio data (e.g., in the form of audio files stored in the memory 108, streaming audio data from an online audio source, voice calls, and so on) is transmitted, via the Bluetooth connection, from the computing device 102 to the audio output device 112, which outputs the audio data. Additionally or alternatively, the computing device 102 and the audio output device 112 are connected via a wired connection, and audio data is communicated for output at the audio output device 112 via the wired connection.

The example environment 100 additionally includes one or more audio source devices 116. Broadly, the audio source devices 116 are media output devices (e.g., smart TVs, display devices, tablets, broadcast public addresses) that include a transmitter 118 capable of transmitting an audio broadcast 120. In one or more implementations, the audio broadcast 120 includes advertisements 122. In general, the advertisements 122 are signals that include information about the audio broadcast 120 (e.g., broadcast name, name of audio source device 116, content description, codec configuration, and so on), and generally advertise the availability of an in-range audio broadcast 120. In accordance with the described techniques, the computing device 102 scans for advertisements 122 from one or more audio source devices 116, and uses the information received as part of the advertisements 122 to facilitate a connection to the audio broadcast 120.

In addition, the audio broadcast 120 includes one or more audio streams 124, which generally include audio data to be played back at the computing device 102 or the audio output device 112. The audio streams 124 can include any form of audio communication, such as news media, entertainment, information, and music, to name just a few. In implementation scenarios in which an audio source device 116 includes a display screen (e.g., a smart TV), the transmitter 118 transmits the audio broadcast 120, which includes the audio stream(s) 124, accompanying and synchronized with video playback displayed by the display screen of the audio source device 116.

As shown, the computing device 102 and the audio output device 112 include respective receivers 126a, 126b that are capable of receiving audio stream(s) 124 of an audio broadcast 120. In one or more implementations, the computing device 102 uses the information received as part of the advertisements 122 to connect directly to an audio broadcast 120. As part of this, the receiver 126a receives an audio stream 124, and an integrated audio output device 128 of the computing device 102 outputs the audio stream 124. In accordance with different computing device 102 configurations, the integrated audio output device 128 corresponds to built-in speaker(s) of a mobile device (e.g., smartphone, laptop, tablet) or speakers of a wireless audio output device, e.g., wireless headphones, wireless earbuds, wireless hearing aids, wireless speakers.

Additionally or alternatively, the computing device 102 directs the audio output device 112 to connect to an audio broadcast 120. To do so, the computing device 102 provides information received as part of the advertisements 122 to the audio output device 112, which enables the audio output device 112 to connect to the audio broadcast 120. As part of this, the receiver 126b receives the audio stream(s) 124, and the audio output device 112 outputs the audio stream(s) 124. In implementations in which the audio output device 112 or the integrated audio output device 128 include a left speaker and a right speaker (e.g., headphones, earbuds, or hearing aids having separate speakers designed to be worn in different ears of a user), the audio streams 124 include a right audio stream and a left audio stream. Further, the right audio stream is transmitted to and output by the right speaker of the device 102, 112, while the left audio stream is transmitted to and output by the left speaker of the device 102, 112.

In one or more implementations, the audio source device 116 is configured to transmit the audio broadcast 120 to a plurality of in-range receivers simultaneously. By way of example, the devices 102, 112, 116 are configured for Auracast in accordance with the Public Broadcast Profile. For example, the audio source device(s) 116 are configured as Broadcast Sources in accordance with the Public Broadcast Profile, while the computing device 102 and the audio output device 112 are configured as Broadcast Sinks in accordance with the Public Broadcast Profile In general, Auracast is a Bluetooth Low Energy (BLE) capability that enables a single audio source device 116 to broadcast audio signals to an unlimited number of in-range receivers concurrently. In these examples, the Auracast audio broadcast is secured with a password for encryption or is publicly available.

It is to be appreciated, however, that the described techniques for audio broadcast management based on audio disruption are not limited to Auracast and/or BLE audio broadcasts. By way of example and not limitation, the described techniques are applicable to Amplitude Modulation (AM) Radio Broadcasts, Frequency Modulation (FM) Radio Broadcasts, Digital Radio (e.g., Digital Audio Broadcasting (DAB and/or DAB+)) Broadcasts, and Internet Radio Broadcasts. Additionally or alternatively, the described techniques are applicable to digital audio streams communicated over a network, e.g., a Wi-Fi network or a cellular network. Additionally or alternatively, the described techniques are applicable to audio files that are maintained in memory 108 and played back at the audio output device 112, 128. In other words, the described techniques for audio broadcast management based on audio disruption are applicable to any one or more of a variety of public or proprietary audio broadcasting techniques, digital audio streaming techniques, and audio playback techniques without departing from the spirit or scope of the described techniques.

Conventional audio broadcast playback technologies have limitations, however. For example, audio broadcasts 120 are often broadcast on a loop or terminate (e.g., cease audio output) after being played through once. Due to this, users of conventional audio broadcast playback techniques often experience repetitive audio of a looped stream or silence of a terminated stream. Additionally or alternatively, users of conventional audio broadcast playback techniques go through the tedious process of manually initiating connections to and disconnections from audio broadcasts 120. The user experience when interacting with audio broadcasts 120 of conventionally configured systems is diminished for at least these reasons.

Accordingly, techniques for audio broadcast management based on audio disruption are described herein as implemented by a broadcast management system 130. As shown, the broadcast management system 130 includes an audio disrupt event detection module 132 and a connection management module 134. In one or more implementations, the broadcast management system 130, the audio disrupt event detection module 132, and the connection management module 134 (e.g., the systems and modules) include processing, memory, and/or logic components (e.g., implemented in circuitry) of the computing device 102. Additionally or alternatively, the systems and modules are implemented in software, in hardware, or as a combination of software and hardware components. Additionally or alternatively, the systems and modules are implemented as software application(s) and/or algorithms embodied in executable software instructions stored on computer-readable storage memory (e.g., the memory 108) of the computing device 102, which are executable by a processor (e.g., the processor system 106) of the computing device 102. Additionally or alternatively, the systems and modules are implemented in firmware and/or at least partially in computer hardware, e.g., at least part of the systems and modules are implemented as software instructions executable by processors of the computing device 102, and/or at least part of the systems and modules are implemented in logic circuitry of the computing device 102.

In accordance with the described techniques, the audio disrupt event detection module 132 is indicative of functionality for detecting audio disrupt events in the audio stream(s) 124 being output at the audio output device 112 or the integrated audio output device 128. As part of this, the audio disrupt event detection module 132 collects audio intensity data and audio frequency data of the audio stream(s) 124 output at the audio output device 112 or the integrated audio output device 128. Based on the audio intensity data and the audio frequency data, the audio disrupt event detection module 132 detects audio disrupt events. Broadly, an audio disrupt event is representative of a point in time in which the audio stream(s) 124 restart on a loop or the audio stream(s) 124 cease causing output of audio at the audio output device 112, 128.

The connection management module 134 is representative of functionality for disconnecting from a looped and/or terminated audio broadcast 120, and/or connecting to a new source of audio content, e.g., a different in-range audio broadcast 120. As part of this, the connection management module 134 initiates a disconnection from the audio broadcast 120 for which an audio disrupt event was detected. In some implementations, initiating the disconnection includes communicating a disconnection instruction to the audio output device 112 directing the audio output device 112 (e.g., the receiver 126b) to disconnect from the audio broadcast 120. Alternatively, initiating the disconnection includes disconnecting the computing device 102 (e.g., the receiver 126a) from the audio broadcast 120.

In one or more implementations, the connection management module 134 initiates a connection to a different in-range audio broadcast 120. In various examples, initiating the connection includes communicating a connection instruction to the audio output device 112 (e.g., the receiver 126b) directing the audio output device 112 to connect to the different audio broadcast 120. Alternatively, initiating the connection includes connecting the different audio broadcast 120 to the computing device 102, e.g., the receiver 126*a*.

Accordingly, the described techniques provide functionality for automatically disconnecting from a looped and/or terminated audio broadcast 120 and, in response, automatically connecting to a new in-range audio broadcast 120. By doing so, the described techniques improve user experience with audio broadcasts 120 by relieving the user of listening to repeated audio of a looped audio broadcast 120, listening to silence of a terminated audio broadcast 120, and/or manually initiating broadcast disconnection and broadcast connection processes.

Figure 2:
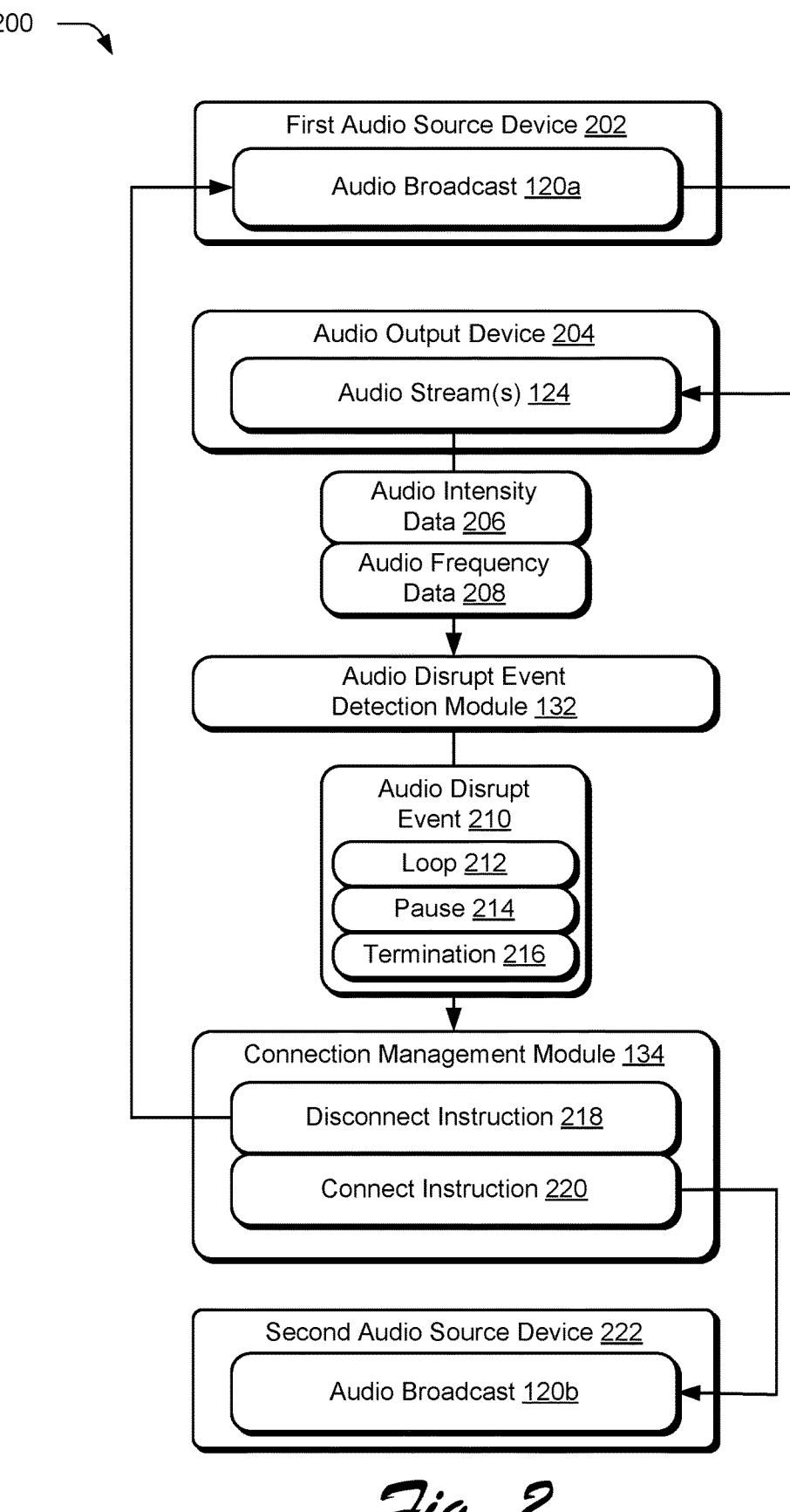
FIG. 2 depicts an example system in which aspects of audio broadcast management based on audio disruption can be implemented.

FIG. 2 depicts an example system 200 in which aspects of audio broadcast management based on audio disruption can be implemented. In the example system 200, a first audio source device 202 is broadcasting an audio broadcast 120*a*. Furthermore, the computing device 102 or the audio output device 112 is connected to the audio broadcast 120*a*. As shown, the audio broadcast 120*a* is providing one or more audio streams 124 to the computing device 102 or the audio output device 112 for output by an audio output device 204, e.g., the audio output device 112 or the integrated audio output device 128.

As shown, the audio disrupt event detection module 132 collects audio intensity data 206 and audio frequency data 208 of the audio stream 124. In accordance with the described techniques, the audio disrupt event detection module 132 analyzes the audio intensity data 206 and the audio frequency data 208 to detect an audio disrupt event 210. In one or more implementations, the data 206, 208 is collected and analyzed as the audio stream(s) 124 are played back at the audio output device 204. By way of example, the audio disrupt event detection module 132 analyzes portions of the audio stream(s) 124 that have been played back at the audio output device 204, and not portions of the audio stream(s) 124 that have not yet been played back. In this way, an audio disrupt event 210 is detected when the audio disrupt event 210 occurs, i.e., when the audio disrupt event 210 is heard by a user.

In one or more implementations, the audio disrupt event detection module 132 detects, as the audio disrupt event 210, a loop 212 in the audio stream(s) 124 of the audio broadcast 120*a*. To do so, the audio disrupt event detection module 132 generates a spectrogram by plotting, based on the audio frequency data 208, frequency of the audio stream(s) 124 against time. Furthermore, the audio disrupt event detection module 132 analyzes the spectrogram for repeating patterns using any one of a variety of public or proprietary spectrogram pattern recognition techniques. Once a portion of the spectrogram (e.g., representing at least a threshold amount of time) matches a previous portion of the spectrogram in accordance with a certain confidence level, the audio disrupt event detection module 132 detects a loop 212. In a specific but non-limiting example, the audio disrupt event detection module 132 detects the loop 212 based on a period of two seconds in the spectrogram matching a previous two seconds of the spectrogram with a 95% confidence level.

Additionally or alternatively, the audio disrupt event detection module 132 detects, as the audio disrupt event 210, a pause 214 or a termination 216 in the audio stream(s) 124 of the audio broadcast 120*a* that has been output by the audio output device 204. To do so, the audio disrupt event detection module 132 analyzes the audio intensity data 206. Notably, the audio intensity data 206 is a measurement of audio intensity of the digital audio signals received by the audio output device 204, as opposed to a measurement of audio intensity output by the audio output device 204. In other words, the audio intensity data 206 captures an audio intensity that is independent of a user-specified volume setting specified for the audio output device 204. In accordance with the described techniques, the audio disrupt event detection module 132 detects the pause 214 or termination 216 based on an audio intensity (e.g., an amplitude of an audio waveform) of the audio stream(s) 124 falling below a threshold audio intensity for at least a threshold amount of time. Thus, in addition to detecting terminated audio streams 124, the audio disrupt event detection module 132 detects pauses 214 before looped audio broadcasts 120 restart the audio stream(s) 124, e.g., before any looped audio has repeated.

Additionally or alternatively, the audio disrupt event detection module 132 detects, as the audio disrupt event 210, a predefined time limit associated with the audio broadcast 120*a* having elapsed. By way of example, the first audio source device 202 communicates metadata of the audio broadcast 120*a* to the computing device 102 indicating a predefined time limit for the audio broadcast 120*a*. In variations, the metadata is communicated as part of the advertisements 122 of the audio broadcast 120*a*, over a network (e.g., a cellular network or a Wi-Fi network), and/or via a peer-to-peer connection between the audio source device 116 and the computing device 102, e.g., a Bluetooth connection, a Wi-Fi direct connection, or a cloud-enabled peer-to-peer connection. The audio disrupt event detection module 132 receives the metadata indicating the predefined time limit, and tracks an amount of time that has elapsed since the audio broadcast 120*a* was connected. In response to the predefined time limit having elapsed since the audio broadcast 120*a* was connected, the audio disrupt event detection module 132 detects an audio disrupt event 210

Once detected, the audio disrupt event detection module 132 provides an indication of the audio disrupt event 210 to the connection management module 134, as shown. In response to receiving the indication of the audio disrupt event 210, the connection management module 134 issues a disconnection instruction 218 and/or a connection instruction 220. The disconnection instruction 218 causes disconnection from the audio broadcast 120*a* of the first audio source device 202, while the connection instruction 220 causes connection of an audio broadcast 120*b* of a second audio source device 222. To facilitate the connection, the connection instruction 220 includes information received as part of the advertisements 122 of the audio broadcast 120*b*, in one or more implementations.

In examples including the wireless connection 110 to the audio output device 112, the instructions 218, 220 are communicated to the audio output device 112 and direct the audio output device 112 to disconnect from the audio broadcast 120*a* and connect to the audio broadcast 120*b*. In examples excluding the wireless connection 110 to the audio output device 112, the instructions 218, 220 are communicated internally (e.g., within the computing device 102) to the receiver 126*a* causing the computing device 102 to disconnect from the audio broadcast 120*a* and connect to the audio broadcast 120*b*. Regardless, the audio output device 204 ceases outputting the audio stream(s) 124 of the audio broadcast 120*a*, and begins outputting the audio stream(s) 124 of the audio broadcast 120*b*. As further discussed below with reference to FIGS. 3-5, broadcast management settings (e.g., specified by a user of the devices 102, 112) control whether to connect to a new audio broadcast 120, and/or which one of a plurality of in-range, available audio broadcasts 120 to connect to.

FIG. 3 depicts an example 300 in which a previous audio broadcast is automatically restored responsive to an audio disrupt event. In the example 300, the audio output device 204 is connected to a current audio broadcast 302 that is broadcast by the first audio source device 202. Prior to connecting to the current audio broadcast 302, the audio output device 204 was connected to a previous audio broadcast 304 broadcast by the second audio source device 222. As discussed herein, connection to and disconnection from the audio output device 204 corresponds to connection to and disconnection from either the receiver 126a of the computing device 102 or the receiver 126b of the audio output device 112.

In at least one example, the broadcast management system 130 transitioned from a connection to the previous audio broadcast 304 to a connection to the current audio broadcast 302 automatically. Indeed, as further discussed below with reference to FIG. 5, multiple in-range audio broadcasts are ranked by the broadcast management system 130 based on various ranking criteria. In this example, the broadcast management system 130 transitions to the current audio broadcast 302 based on the current audio broadcast 302 being associated with a higher ranking than the previous audio broadcast 304. Additionally or alternatively, the current audio broadcast 302 is transitioned to based on a user selection to connect to the current audio broadcast 302.

As shown, the connection management module 134 includes broadcast management settings 306. Broadly, the broadcast management settings 306 are user-specifiable preferences controlling actions taken by the connection management module 134 in response to an audio disrupt event 210. In one or more implementations, the broadcast management settings 306 are specifiable via user input to a broadcast settings menu (e.g., a user interface) displayed on the display screen 104 of the computing device 102. In the example 300, the broadcast management settings 306 include a preference to restore previous audio session 308. This preference dictates that, when an audio disrupt event 210 is detected, the connection management module 134 connects to an audio session that was previously in progress when the current audio broadcast 302 was connected.

Thus, in response to receiving an audio disrupt event 210 of the current audio broadcast 302, the connection management module 134 issues the disconnection instruction 218 which causes disconnection of the audio output device 204 from the current audio broadcast 302. In addition, the connection management module 134 issues the connection instruction 220 which causes connection of the audio output device 204 to the previous audio broadcast 304.

In one or more alternative scenarios, the audio output device 204 was connected to a non-broadcasted audio source immediately before the current audio broadcast 302 was connected, such as a downloaded audio file, an audio stream from an online audio streaming application, or an audio stream from an online video streaming application. In these implementations, the connection management module 134 connects the non-broadcasted audio source, rather than an audio broadcast 120 (even if there are in-range, available audio broadcasts 120). Regardless, the connection management module 134 resumes the previous audio stream (e.g., the previous audio broadcast 304 non-broadcasted audio source) from a point at which the previous audio stream was disconnected.

Figure 4:
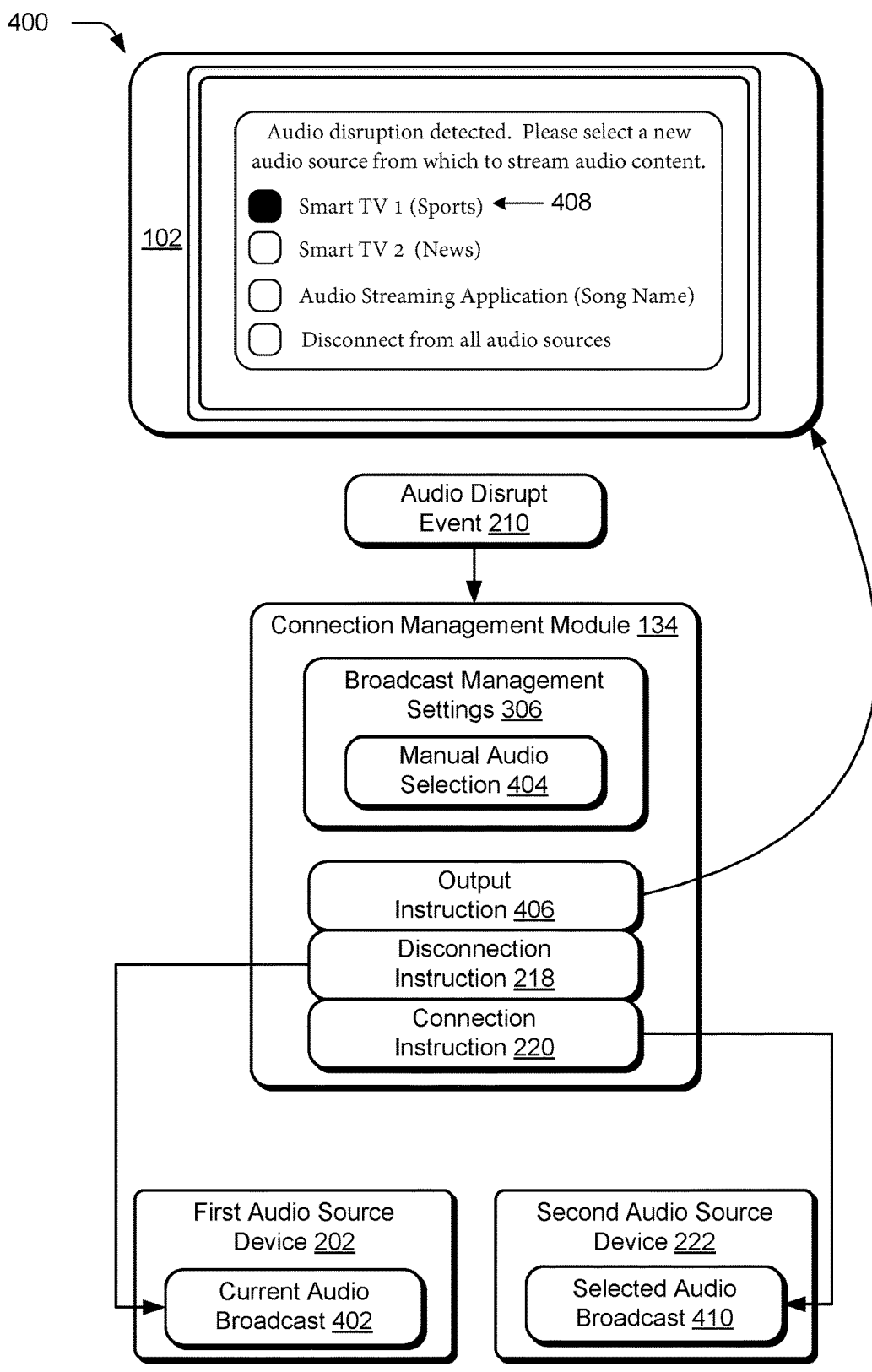
FIG. 4 depicts an example in which a new audio broadcast is connected based on user input responsive to an audio disrupt event.

FIG. 4 depicts an example 400 in which a new audio broadcast is connected based on user input responsive to an audio disrupt event. In the example 400, the audio output device 204 is connected to a current audio broadcast 402 broadcast by the first audio source device 202. Further, the broadcast management settings 306 include a preference for manual audio selection 404. This preference dictates that, when an audio disrupt event 210 is detected, the connection management module 134 outputs indications of in-range audio broadcasts 120 that are connectable to by the audio output device 204.

Thus, in response to receiving an audio disrupt event 210 of the current audio broadcast 402, the connection management module 134 issues an output instruction 406. In the illustrated example, the computing device 102 is a mobile device with a display screen 104. In this example, the output instruction 406 causes the display screen 104 of the computing device 102 to display visual indications of the audio source devices 116 that are in-range and broadcasting audio broadcasts 120, e.g., "Smart TV 1," and "Smart TV 2". In addition, the output instruction 406 causes the display screen 104 of the computing device 102 to display visual indications of one or more non-broadcasted audio sources, e.g., "Audio Streaming Application." The display further includes visual indications of the audio content that the audio source is outputting (e.g., "Sports," "News," and a song name of the audio streaming application). The display further includes a user-selectable option to disconnect from all audio sources and terminate audio output at the audio output device 204.

Furthermore, user input is received (e.g., as shown at 408) selecting a particular audio source to connect to. In response to this, the connection management module 134 issues the disconnection instruction 218 causing disconnection of the audio output device 204 from the current audio broadcast 402. In one or more examples, the selected audio source is a particular audio source device 116 of the multiple in-range audio source devices 116. In these examples, the connection management module 134 issues the connection instruction 220 causing connection of the audio output device 204 to a selected audio broadcast 410 of the selected audio source device 116 (e.g., "Smart TV 1"), as shown. In alternative examples in which the non-broadcasted audio source is selected, the connection management module 134 initiates an audio streaming session with the audio source, e.g., "Audio Streaming Application." If the user-selectable option to disconnect from all audio sources is selected, the connection management module 134 disconnects from all audio sources.

In implementations in which the computing device 102 is a wireless audio output device without a display screen 104 (e.g., wireless headphones, wireless earbuds, wireless hearing aids), the output instruction 406 causes the computing device 102 to output audible indications of the in-range audio source devices 116, other available audio sources, and the user-selectable option to disconnect from all audio sources. Further, user input selecting the particular audio source is received as voice data captured by a microphone of the computing device 102 and processed using voice recognition techniques.

Figure 5:
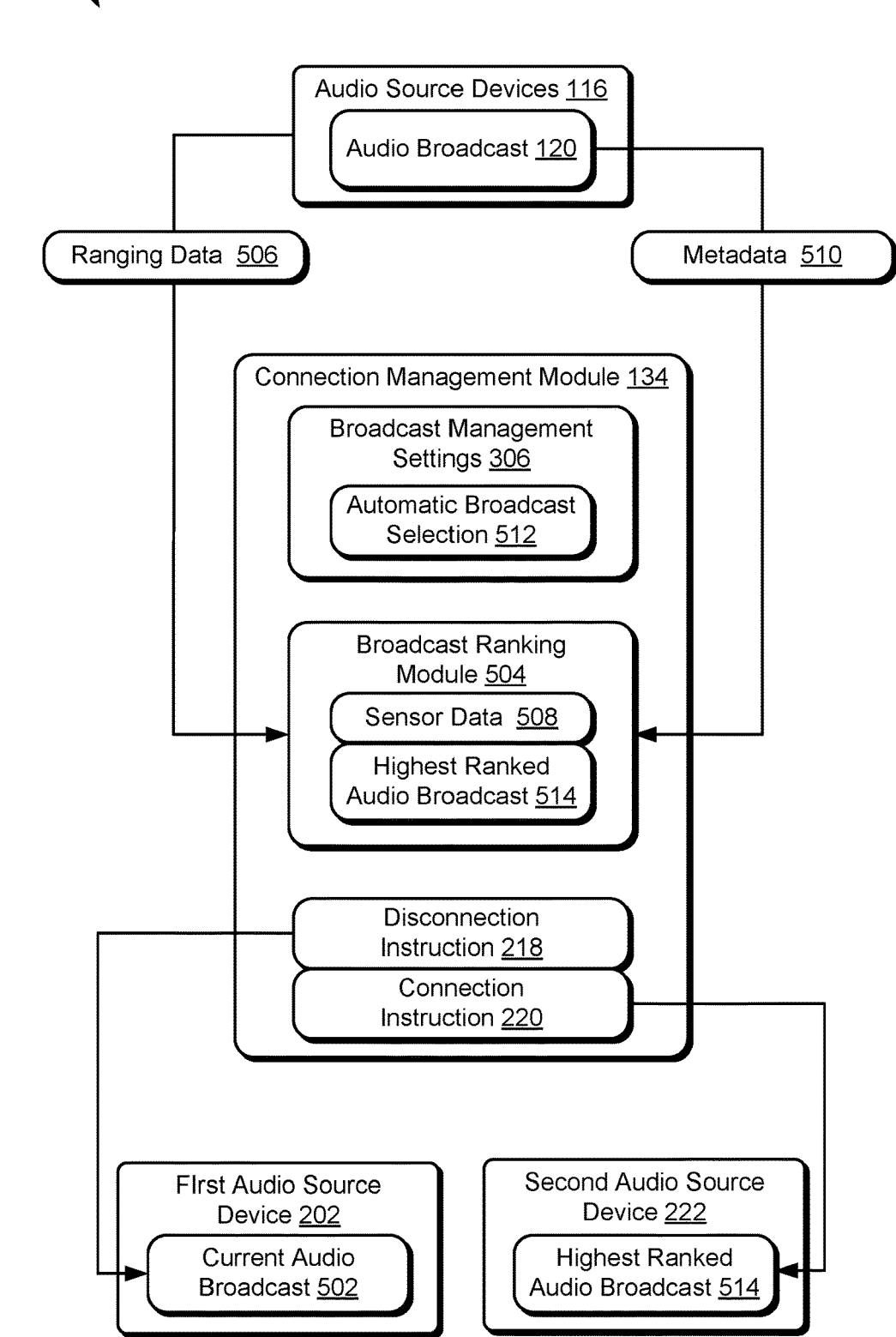
FIG. 5 depicts an example in which a new audio broadcast is automatically connected responsive to an audio disrupt event.

FIG. 5 depicts an example 500 in which a new audio broadcast is automatically connected responsive to an audio disrupt event. In the example 500, the audio output device 204 is connected to a current audio broadcast 502 that is broadcast by the first audio source device 202. In addition, the connection management module 134 includes a broadcast ranking module 504, which is representative of functionality for ranking in-range audio broadcasts 120, as broadcast by multiple audio source devices 116. In one or more implementations, the broadcast ranking module 504 ranks the in-range audio broadcasts 120 based on a position of the audio output device 204 (e.g., the computing device 102 or the audio output device 112) relative to the locations of the multiple audio source devices 116. To facilitate this, the radio devices 114a, 114b of the computing device 102 and the audio output device 112 include ultra-wideband (UWB) radios, in one or more implementations. In addition, the audio source devices 116 include integrated UWB radios, and/or UWB tags are affixed proximate to, and associated with, respective audio source devices 116.

Notably, UWB is a radio technology that can be utilized for secure, spatial location applications using very low energy for short-range, high-bandwidth communications. The technology is detailed by the IEEE 802.15.4z standard for Enhanced Ultra-Wideband (UWB) Physical Layers (PHYs) and Associated Ranging Techniques for accurate relative position tracking, which provides for applications using relative distance between entities. Notably, UWB utilizes double-sided, two-way ranging between devices and provides for highly precise positioning, within 10 cm of ranging accuracy in as little as three degrees of precision through time-of-flight (ToF) and angle-of-arrival (AoA) measurements at up to 100 m through the use of impulse radio communications in the 6-10 GHz frequency range. The positioning is an accurate and secure technology using the scrambled timestamp sequence (STS), cryptographically secure pseudo-random number generation, and other features of the UWB PHY.

In one or more implementations, the broadcast ranking module 504 determines the location of the audio source devices 116 in the environment based on a location of the UWB radios and/or UWB tags of the audio source devices 116 relative to the position of the UWB radio in the device 102, 112 implementing the audio output device 204. For example, the broadcast ranking module 504 utilizes UWB ranging data 506, such as time-of-flight (ToF), angle-of-arrival (AoA), and/or time-difference-of-arrival (TDoA) to determine UWB tag and UWB radio locations in the environment. Using the UWB ranging data 506, the broadcast ranking module 504 determines distances of the device 102, 112 implementing the audio output device 204 from the audio source devices 116.

Additionally or alternatively, the broadcast ranking module 504 uses the UWB ranging data 506 (and AoA techniques) and/or sensor data 508 (captured by one or more sensors of the computing device 102) to determine a direction that the computing device 102 is facing and an audio source device 116 that a user's orientation is likely facing toward. The sensor data 508 can include GPS data (e.g., captured by a GPS sensor of the computing device 102) indicating a direction of travel (e.g., a direction in which the user is walking), and as such, a likely direction that the user is facing. Additionally or alternatively, the sensor data 508 can include orientation data indicating an orientation of the computing device 102 (e.g., captured by a gyrometer of the device 102), indicating a likely direction that the user is facing. Additionally or alternatively, the sensor data 508 can include facial recognition data and/or eye gaze detection data (e.g., captured by a camera of the computing device 102) indicating a likely direction in which the user is looking. Based on the likely direction in which the user is facing and/or looking (e.g., as indicated by the sensor data 508) in combination with the direction from which the UWB ranging signals are received (e.g., as indicated by the AoA data), the broadcast ranking module 504 determines, for each of the audio source devices 116, a probability that the user is looking at and/or facing towards the audio source device 116.

In one or more implementations, the broadcast ranking module 504 ranks the in-range audio broadcasts 120 based on metadata 510 (e.g., transmitted as part of the advertisements 122) of the in-range audio broadcasts 120. In one or more examples, the metadata 510 includes an indication of whether an audio broadcast 120 is an emergency broadcast. Additionally or alternatively, the metadata 510 includes information describing the subject of an audio broadcast 120, such as the type of content (e.g., music, news, sports, information, etc.), or a subtype of content, e.g., hip-hop music, rock music, jazz music, pop music. In various implementations, the broadcast ranking module 504 compares the types and/or subtypes of the content of the audio broadcasts 120 to user content preferences, e.g., specified by the user of the computing device 102 as part of the broadcast management settings 306. Further, the broadcast ranking module 504 determines degrees of correspondence of the content types and/or content subtypes of respective in-range audio broadcasts 120 with the user content preferences.

The broadcast ranking module 504 ranks the in-range audio broadcasts 120 based on one or more of the distances of the audio output device 204 from the audio source devices 116, the probabilities of the user looking at and/or facing towards respective audio source devices 116, whether the audio broadcasts 120 are emergency broadcasts, and the degrees of correspondence of the audio broadcasts 120 with the user content preferences. By way of example, the broadcast ranking module 504 leverages a ranking algorithm that assigns higher ranking scores to audio broadcasts 120: (1) that are transmitted by audio source devices 116 that are positionally closer to the audio output device 112, (2) that are transmitted by audio source devices 116 that the user is more likely to be looking at and/or facing towards, and (3) having higher degrees of correspondence with the user content preferences. In addition, the broadcast ranking module 504 automatically assigns higher ranking scores to emergency broadcasts over non-emergency broadcasts.

In the example 500, the broadcast management settings 306 include a preference for automatic stream selection 512. This preference dictates that, when an audio disrupt event 210 is detected, the connection management module 134 automatically (e.g., without human intervention) initiates a connection to a new in-range audio broadcast 120. In particular, the connection management module 134 automatically initiates a connection to a highest ranked audio broadcast 514 of the multiple in-range audio broadcasts 120 (excluding the current audio broadcast 502). Thus, in response to receiving an audio disrupt event 210 of the current audio broadcast 502, the connection management module 134 issues the disconnection instruction 218 causing disconnection of the audio output device 204 from the current audio broadcast 502. In addition, the connection management module 134 issues the connection instruction 220 causing connection of the audio output device 204 to the highest ranked audio broadcast 514, e.g., broadcast by the second audio source device 222.

In one or more implementations, the broadcast management settings 306 include a preference to terminate audio output in response to an audio disrupt event 210. When this preference is specified, the connection management module 134 initiates a disconnection from a currently connected audio broadcast 120 responsive to an audio disrupt event 210 of the audio broadcast 120 being detected. However, the connection management module 134 does not initiate a connection to a new audio source, e.g., the audio output device 204 ceases to output audio.

FIG. 6 is an example method 600 for audio broadcast management based on audio disruption, as implemented by a wireless device communicatively coupled via a wireless connection to an audio output device. For instance, the example method 600 is implemented by the computing device 102 managing connections of audio broadcasts 120 to the audio output device 112. The order in which the method 600 is described is not intended to be construed as a limitation, and any number or combination of the described method operations can be performed in any order to perform a method, or an alternate method.

In the method 600, an audio broadcast is received from an audio source device (block 602). By way of example, an audio source device 116 broadcasts an audio broadcast 120, and the computing device 102 receives advertisements 122 of the audio broadcast 120.

A connection instruction is issued directing an audio output device to connect to the audio broadcast (block 604). By way of example, the computing device 102 communicates a connection instruction 220 to the audio output device 112. The connection instruction 220 instructs the audio output device 112 to connect to the audio broadcast 120 using information received as part of the advertisements 122.

An audio disrupt event of the audio broadcast is detected based on audio frequency data, audio intensity data, or a predefined time limit associated with the audio broadcast (block 606). By way of example, the audio disrupt event detection module 132 detects, as the audio disrupt event 210, a loop 212 in the audio broadcast 120. To do so, the audio disrupt event detection module 132 generates a spectrogram based on the audio frequency data 208 of the audio broadcast 120, and detects repeating patterns in the spectrogram. Additionally or alternatively, the audio disrupt event detection module 132 detects, as the audio disrupt event 210, a pause 214 or termination 216 in the audio broadcast 120. To do so, the audio disrupt event detection module 132 detects, based on the audio intensity data 206, an audio intensity of the audio broadcast 120 falling below a threshold audio intensity for at least a threshold amount of time. Additionally or alternatively, the audio disrupt event detection module 132 receives metadata from the audio source device 116 (e.g., transmitted as part of the advertisements 122) specifying a predefined time limit, and detects the audio disrupt event 210 responsive to the predefined time limit having elapsed since the connection of the audio broadcast 120 to the audio output device 112.

A disconnection instruction is issued in response to the audio disrupt event directing the audio output device to disconnect from the audio broadcast event (block 608). By way of example, the connection management module 134 communicates a disconnection instruction 218 to the audio output device 112 in response to the audio disrupt event 210 being detected. The disconnection instruction 218 instructs the audio output device 112 to disconnect from the audio broadcast 120.

An additional connection instruction is issued directing the audio output device to connect to a new audio broadcast received from a different audio source device (block 610). By way of example, the connection management module 134 communicates an additional connection instruction 220 to the audio output device 112 in response to the audio broadcast 120 being disconnected. The additional connection instruction 220 instructs the audio output device 112 to connect to a new audio broadcast 120, as broadcast by a different audio source device 116. Depending on the broadcast management settings 306 specified by the user, the new audio broadcast 120 is either (1) a previous audio broadcast 120 that was disconnected in order to initiate a current audio broadcast 120, (2) an audio broadcast 120 that was specified, via user input, from a list of in-range audio broadcasts 120, or (3) an automatically selected audio broadcast 120 that is ranked highest by the ranking module 504 from among a plurality of in-range audio broadcasts 120.

FIG. 7 is an example method 700 for audio broadcast management based on audio disruption, as implemented by a standalone wireless device. For instance, the example method 700 is implemented by the computing device 102 to connect directly to and disconnect directly from audio broadcasts. The order in which the method 700 is described is not intended to be construed as a limitation, and any number or combination of the described method operations can be performed in any order to perform a method, or an alternate method.

In the method 700, an audio broadcast is received from an audio source device (block 702). By way of example, the audio source device 116 broadcasts an audio broadcast 120, and the computing device 102 receives advertisements 122 of the BLE audio broadcast.

The audio broadcast is connected to (block 704). By way of example, the computing device 102 connects the receiver 126a to the audio broadcast 120 using information received as part of the advertisements 122. The connection causes an integrated audio output device 128 of the computing device 102 to output audio stream(s) 124 of the audio broadcast 120.

An audio disrupt event of the audio broadcast is detected based on audio intensity data, audio frequency data, or a predefined time limit associated with the audio broadcast (block 706). By way of example, the audio disrupt event detection module 132 detects, as the audio disrupt event 210, a loop 212 in the audio broadcast 120. To do so, the audio disrupt event detection module 132 generates a spectrogram based on the audio frequency data 208 of the audio broadcast 120, and detects repeating patterns in the spectrogram. Additionally or alternatively, the audio disrupt event detection module 132 detects, as the audio disrupt event 210, a pause 214 or termination 216 in the audio broadcast 120. To do so, the audio disrupt event detection module 132 detects, based on the audio intensity data 206, an audio intensity of the audio broadcast 120 falling below a threshold audio intensity for at least a threshold amount of time. Additionally or alternatively, the audio disrupt event detection module 132 receives metadata from the audio source device 116 (e.g., transmitted as part of the advertisements 122) specifying a predefined time limit, and detects the audio disrupt event 210 responsive to the predefined time limit having elapsed since the connection of the audio broadcast 120 to the receiver 126a of the computing device 102.

The audio broadcast is disconnected from in response to the audio disrupt event (block 708). By way of example, the connection management module 134 disconnects the receiver 126a from the audio broadcast 120 in response to the audio disrupt event 210 being detected.

A new audio broadcast received from a different audio source device is connected to (block 710). By way of example, the connection management module 134 connects the receiver 126a to a new audio broadcast 120, as broadcast by a different audio source device 116. Depending on the broadcast management settings 306 specified by the user, the new audio broadcast 120 is either (1) a previous audio broadcast 120 that was disconnected in order to initiate a current audio broadcast 120, (2) an audio broadcast 120 that was specified, via user input, from a list of in-range audio broadcasts 120, or (3) an automatically selected audio broadcast 120 that is ranked highest by the ranking module 504 from among a plurality of in-range audio broadcasts 120.

Figure 8:
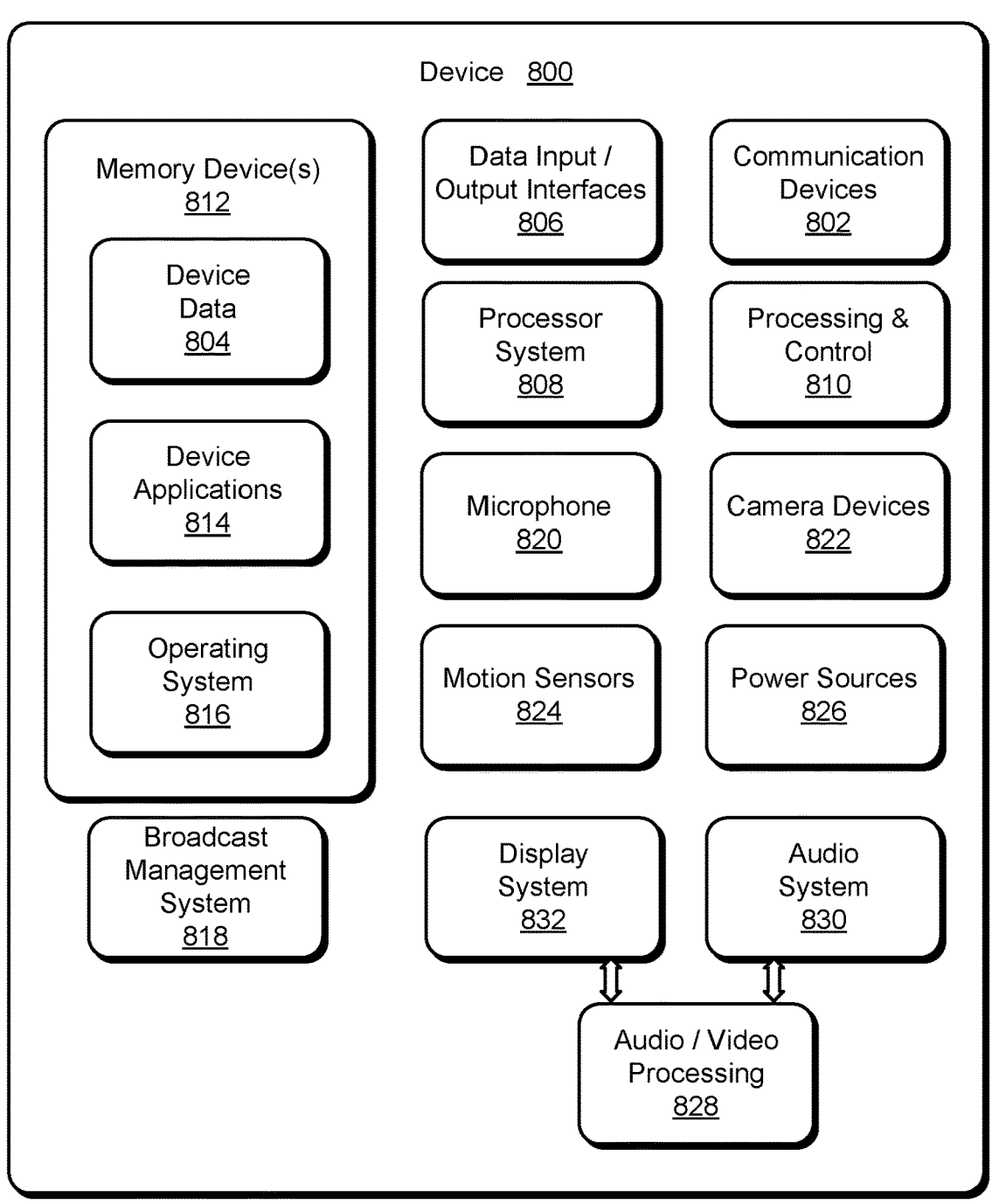
FIG. 8 illustrates various components of an example device that can implement aspects of audio broadcast management based on audio disruption.

FIG. 8 illustrates various components of an example device 800 which can implement aspects of the techniques and features for audio broadcast management based on audio disruption, as described herein. The example device 800 can be implemented as any of the devices described with reference to the previous FIGS. 1-7, such as any type of a wireless device, mobile device, mobile phone, flip phone, client device, companion device, paired device, display device, audio output device, wireless headphones, wireless earbuds, wireless hearing aids, tablet, computing, communication, entertainment, gaming, media playback, and/or any other type of computing and/or electronic device. For example, the computing device 102, the audio output device 112, and/or the audio source device(s) 116 described with reference to FIGS. 1-7 may be implemented as the example device 800.

The example device 800 can include various, different communication devices 802 that enable wired and/or wireless communication of device data 804 with other devices. The device data 804 can include any of the various devices data and content that is generated, processed, determined, received, stored, and/or communicated from one computing device to another. Generally, the device data 804 can include any form of audio, video, image, graphics, and/or electronic data that is generated by applications executing on a device. The communication devices 802 can also include transceivers for cellular phone communication and/or for any type of network data communication.

The example device 800 can also include various, different types of data input/output (I/O) interfaces 806, such as data network interfaces that provide connection and/or communication links between the devices, data networks, and other devices. The I/O interfaces 806 can be used to couple the device to any type of components, peripherals, and/or accessory devices, such as a computer input device that may be integrated with the example device 800. The I/O interfaces 806 may also include data input ports via which any type of data, information, media content, communications, messages, and/or inputs can be received, such as user inputs to the device, as well as any type of audio, video, image, graphics, and/or electronic data received from any content and/or data source.

The example device 800 includes a processor system 808 of one or more processors (e.g., any of microprocessors, controllers, and the like) and/or a processor and memory system implemented as a system-on-chip (SoC) that processes computer-executable instructions. The processor system 808 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 810. The example device 800 may also include any type of a system bus or other data and command transfer system that couples the various components within the device. A system bus can include any one or combination of different bus structures and architectures, as well as control and data lines.

The example device 800 also includes memory and/or memory devices 812 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 812 include volatile memory and non-volatile memory, fixed and removable media devices, and any suitable memory device or electronic data storage that maintains data for computing device access. The memory devices 812 can include various implementations of random-access memory (RAM), read-only memory (ROM), flash memory, and other types of storage media in various memory device configurations. The example device 800 may also include a mass storage media device.

The memory devices 812 (e.g., as computer-readable storage memory) provide data storage mechanisms, such as to store the device data 804, other types of information and/or electronic data, and various device applications 814 (e.g., software applications and/or modules). For example, an operating system 816 can be maintained as software instructions with a memory device 812 and executed by the processor system 808 as a software application. The device applications 814 may also include a device manager, such as any form of a control application, software application, signal-processing and control module, code that is specific to a particular device, a hardware abstraction layer for a particular device, and so on.

In this example, the device 800 includes a broadcast management system 818 that implements various aspects of the described features and techniques for audio broadcast management based on audio disruption. The broadcast management system 818 can be implemented with hardware components and/or in software as one of the device applications 814, such as when the example device 800 is implemented as the computing device 102. An example of the broadcast management system 818 includes the broadcast management system 130 that is implemented by the computing device 102, such as a software application and/or as hardware components in the computing device. In implementations, the broadcast management system 818 may include independent processing, memory, and logic components as a computing and/or electronic device integrated with the example device 800.

The example device 800 can also include a microphone 820 and/or camera devices 822, as well as motion sensors 824, such as may be implemented as components of an inertial measurement unit (IMU). The motion sensors 824 can be implemented with various sensors, such as a gyroscope, GPS positioning sensors, an accelerometer, and/or other types of motion sensors to sense motion of the device. The motion sensors 824 can generate sensor data vectors having three-dimensional parameters (e.g., rotational vectors in x, y, and z-axis coordinates) indicating location, position, acceleration, rotational speed, and/or orientation of the device. The example device 800 can also include one or more power sources 826, such as when the device 800 is implemented as a wireless device and/or mobile device. The power sources may include a charging and/or power system, and can be implemented as a flexible strip battery, a rechargeable battery, a charged super-capacitor, and/or any other type of active or passive power source.

The example device 800 can also include an audio and/or video processing system 828 that generates audio data for an audio system 830 and/or generates display data for a display system 832. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system 830 and/or the display system 832 are integrated components of the example device 800. Alternatively, the audio system and/or the display system are external, peripheral components to the example device 800.

As used herein, including in the claims, "or" as used in a list of items (e.g., a list of items prefaced by a phrase such as "at least one of" or "one or more of" or "based at least in part on") indicates an inclusive list such that, a list of at least one of A, B, or C means A or B or C or AB or AC or BC or ABC (i.e., A and B and C). Further, as used herein, the phrase "based on" shall not be construed as a reference to a closed set of conditions. For example, an operation or determination described as "based on condition A" may be based on both a condition A and a condition B without departing from the scope of the present disclosure, and the phrase "based on" shall be construed in the same manner as the phrase "based at least in part on."

Although implementations for audio broadcast management based on audio disruption have been described in language specific to features and/or methods, the appended claims are not necessarily limited to the specific features or methods described. Rather, the specific features and methods are disclosed as example implementations for audio broadcast management based on audio disruption, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a wireless device, comprising at least one processor, and a memory coupled to the at least one processor, the memory storing instructions which, when executed by the at least one processor, cause the wireless device to receive an audio broadcast from an audio source device, initiate a connection to the audio broadcast, detect an audio disrupt event of the audio broadcast based on audio frequency data, audio intensity data, or a predefined time limit associated with the audio broadcast, and initiate a disconnection from the audio broadcast in response to the audio disrupt event being detected.

In some aspects, the techniques described herein relate to a wireless device, wherein the audio broadcast is a Bluetooth Low Energy (BLE) audio broadcast.

In some aspects, the techniques described herein relate to a wireless device, wherein the audio broadcast is an Auracast audio broadcast.

In some aspects, the techniques described herein relate to a wireless device, wherein to detect the audio disrupt event, the wireless device is configured to detect looped audio in the audio broadcast.

In some aspects, the techniques described herein relate to a wireless device, wherein to detect the looped audio in the audio broadcast, the wireless device is configured to generate a spectrogram of the audio broadcast based on the audio frequency data, and detect repeating patterns in the spectrogram.

In some aspects, the techniques described herein relate to a wireless device, wherein to detect the audio disrupt event, the wireless device is configured to detect paused or terminated audio of the audio broadcast based on an audio intensity of the audio broadcast falling below a threshold audio intensity for at least a threshold amount of time.

In some aspects, the techniques described herein relate to a wireless device, wherein to detect the audio disrupt event, the wireless device is configured to receive, from the audio source device, metadata specifying the predefined time limit associated with the audio broadcast, and detect the predefined time limit having elapsed since the connection to the audio broadcast.

In some aspects, the techniques described herein relate to a wireless device, the instructions further causing the wireless device to initiate, before the connection to the audio broadcast, a previous disconnection from a previous audio broadcast received from an additional audio source device, and initiate a reconnection to the previous audio broadcast in response to the disconnection.

In some aspects, the techniques described herein relate to a wireless device, the instructions further causing the wireless device to receive one or more additional audio broadcasts from one or more additional audio source devices, output indications of the one or more additional audio broadcasts in response to the disconnection, receive a user selection of a particular audio broadcast of the one or more additional audio broadcasts, and initiate a subsequent connection to the particular audio broadcast.

In some aspects, the techniques described herein relate to a wireless device, the instructions further causing the wireless device to receive one or more additional audio broadcasts from one or more additional audio source devices, automatically select a particular audio broadcast of the one or more additional audio broadcasts in response to the disconnection, and initiate a subsequent connection to the particular audio broadcast.

In some aspects, the techniques described herein relate to a wireless device, wherein to automatically select the particular audio broadcast, the wireless device is configured to rank the one or more additional audio broadcasts based on at least one of metadata of the one or more additional audio broadcasts and a position of the wireless device relative to locations of the one or more additional audio source devices, and select, as the particular audio broadcast, a highest ranked audio broadcast.

In some aspects, the techniques described herein relate to a wireless device, the wireless device further comprising an integrated audio output device, wherein the connection and the disconnection are between the wireless device and the audio broadcast, and the connection causes output of the audio broadcast by the integrated audio output device.

In some aspects, the techniques described herein relate to a wireless device, wherein the wireless device is wirelessly coupled to an audio output device, wherein the connection and the disconnection are between the audio output device and the audio broadcast.

In some aspects, the techniques described herein relate to a method, comprising receiving a Bluetooth Low Energy (BLE) audio broadcast from an audio source device, connecting to the BLE audio broadcast, detecting looped audio in the BLE audio broadcast that is output by the wireless device based on audio frequency data of the BLE audio broadcast, and disconnecting from the BLE audio broadcast in response to detecting the looped audio.

In some aspects, the techniques described herein relate to a method, wherein detecting the looped audio in the BLE audio broadcast includes generating a spectrogram of the BLE audio broadcast that is output by the wireless device, and detecting repeating patterns in the spectrogram.

In some aspects, the techniques described herein relate to a method, further comprising disconnecting, before the BLE audio broadcast is connected, from a previous BLE audio broadcast received from an additional audio source device, and reconnecting to the previous BLE audio broadcast in response to disconnecting from the BLE audio broadcast.

In some aspects, the techniques described herein relate to a method, further comprising receiving one or more additional BLE audio broadcasts from one or more additional audio source devices, automatically selecting a particular BLE audio broadcast of the one or more additional BLE audio broadcasts in response to disconnecting from the BLE audio broadcast, and connecting to the particular BLE audio broadcast.

In some aspects, the techniques described herein relate to a method, wherein automatically selecting the particular BLE audio broadcast includes ranking the one or more additional BLE audio broadcasts based on at least one of metadata of the one or more additional BLE audio broadcasts and ranging data associated with the one or more additional audio source devices, and selecting, as the particular BLE audio broadcast, a highest ranked BLE audio broadcast.

In some aspects, the techniques described herein relate to a system, comprising an audio source device, an audio output device, and a wireless device wirelessly coupled to the audio output device, the wireless device configured to receive an Auracast audio broadcast from the audio source device, issue a connection instruction directing the audio output device to connect to the Auracast audio broadcast, detect terminated or paused audio of the Auracast audio broadcast based on audio intensity data of the Auracast audio broadcast, and issue a disconnection instruction directing the audio output device to disconnect from the Auracast audio broadcast in response to the terminated or paused audio being detected.

In some aspects, the techniques described herein relate to a wireless device, wherein to detect the terminated or paused audio, the wireless device is configured to detect an audio intensity of the Auracast audio broadcast falling below a threshold audio intensity for at least a threshold amount of time.

The invention claimed is:

1. A wireless device, comprising:
at least one processor; and
a memory coupled to the at least one processor, the memory storing instructions which, when executed by the at least one processor, cause the wireless device to:
receive an audio broadcast from an audio source device;
initiate a connection to the audio broadcast;
detect an audio disrupt event of the audio broadcast based on audio frequency data, audio intensity data, or a predefined time limit associated with the audio broadcast; and
initiate a disconnection from the audio broadcast in response to the audio disrupt event being detected.

2. The wireless device of claim 1, wherein the audio broadcast is a Bluetooth Low Energy (BLE) audio broadcast.

3. The wireless device of claim 1, wherein the audio broadcast is an Auracast audio broadcast.

4. The wireless device of claim 1, wherein to detect the audio disrupt event, the wireless device is configured to detect looped audio in the audio broadcast.

5. The wireless device of claim 4, wherein to detect the looped audio in the audio broadcast, the wireless device is configured to:
generate a spectrogram of the audio broadcast based on the audio frequency data; and
detect repeating patterns in the spectrogram.

6. The wireless device of claim 1, wherein to detect the audio disrupt event, the wireless device is configured to detect paused or terminated audio of the audio broadcast based on an audio intensity of the audio broadcast falling below a threshold audio intensity for at least a threshold amount of time.

7. The wireless device of claim 1, wherein to detect the audio disrupt event, the wireless device is configured to:
receive, from the audio source device, metadata specifying the predefined time limit associated with the audio broadcast; and
detect the predefined time limit having elapsed since the connection to the audio broadcast.

8. The wireless device of claim 1, the instructions further causing the wireless device to:
initiate, before the connection to the audio broadcast, a previous disconnection from a previous audio broadcast received from an additional audio source device; and
initiate a reconnection to the previous audio broadcast in response to the disconnection.

9. The wireless device of claim 1, the instructions further causing the wireless device to:
receive one or more additional audio broadcasts from one or more additional audio source devices;
output indications of the one or more additional audio broadcasts in response to the disconnection;
receive a user selection of a particular audio broadcast of the one or more additional audio broadcasts; and
initiate a subsequent connection to the particular audio broadcast.

10. The wireless device of claim 9, wherein to automatically select the particular audio broadcast, the wireless device is configured to:
rank the one or more additional audio broadcasts based on at least one of metadata of the one or more additional audio broadcasts and a position of the wireless device relative to locations of the one or more additional audio source devices; and
select, as the particular audio broadcast, a highest ranked audio broadcast.

11. The wireless device of claim 1, the instructions further causing the wireless device to:
receive one or more additional audio broadcasts from one or more additional audio source devices;
automatically select a particular audio broadcast of the one or more additional audio broadcasts in response to the disconnection; and
initiate a subsequent connection to the particular audio broadcast.

12. The wireless device of claim 1, the wireless device further comprising an integrated audio output device, wherein the connection and the disconnection are between the wireless device and the audio broadcast, and the connection causes output of the audio broadcast by the integrated audio output device.

13. The wireless device of claim 1, wherein the wireless device is wirelessly coupled to an audio output device, wherein the connection and the disconnection are between the audio output device and the audio broadcast.

14. A method implemented by a wireless device, comprising:

receiving a Bluetooth Low Energy (BLE) audio broadcast from an audio source device;

connecting to the BLE audio broadcast;

detecting looped audio in the BLE audio broadcast that is output by the wireless device based on audio frequency data of the BLE audio broadcast; and disconnecting from the BLE audio broadcast in response to detecting the looped audio.

15. The method of claim 14, wherein detecting the looped audio in the BLE audio broadcast includes:

generating a spectrogram of the BLE audio broadcast that is output by the wireless device; and detecting repeating patterns in the spectrogram.

16. The method of claim 14, further comprising:

disconnecting, before the BLE audio broadcast is connected, from a previous BLE audio broadcast received from an additional audio source device; and reconnecting to the previous BLE audio broadcast in response to disconnecting from the BLE audio broadcast.

17. The method of claim 14, further comprising:

receiving one or more additional BLE audio broadcasts from one or more additional audio source devices;

automatically selecting a particular BLE audio broadcast of the one or more additional BLE audio broadcasts in response to disconnecting from the BLE audio broadcast; and connecting to the particular BLE audio broadcast.

18. The method of claim 17, wherein automatically selecting the particular BLE audio broadcast includes:

ranking the one or more additional BLE audio broadcasts based on at least one of metadata of the one or more additional BLE audio broadcasts and ranging data associated with the one or more additional audio source devices; and selecting, as the particular BLE audio broadcast, a highest ranked BLE audio broadcast.

19. A system, comprising:

an audio source device;

an audio output device; and a wireless device wirelessly coupled to the audio output device, the wireless device configured to:

receive an Auracast audio broadcast from the audio source device;

issue a connection instruction directing the audio output device to connect to the Auracast audio broadcast;

detect terminated or paused audio of the Auracast audio broadcast based on audio intensity data of the Auracast audio broadcast; and issue a disconnection instruction directing the audio output device to disconnect from the Auracast audio broadcast in response to the terminated or paused audio being detected.

20. The system of claim 19, wherein to detect the terminated or paused audio, the wireless device is configured to detect an audio intensity of the Auracast audio broadcast falling below a threshold audio intensity for at least a threshold amount of time.

* * * * *